United States Patent [19]

Sutphin

[11] 4,231,867
[45] Nov. 4, 1980

[54] METHOD AND APPARATUS FOR TREATING HETEROGENEOUS FLUID SYSTEMS

[76] Inventor: Eldon M. Sutphin, 306 Field Club Ridge Rd., Pittsburgh, Pa. 15238

[21] Appl. No.: 71,527

[22] Filed: Aug. 31, 1979

[51] Int. Cl.$^2$ .............................................. B01D 17/04
[52] U.S. Cl. .................................. 210/703; 210/218; 210/221 P; 210/712; 210/DIG. 5
[58] Field of Search ............. 210/23 R, 43, 44, 73 W, 210/83, 84, 167, 194, 197, 218, 220, 221 R, 221 P, 519, 52 H, DIG. 5, DIG. 26, DIG. 25, DIG. 27; 261/77, 124

[56] References Cited
U.S. PATENT DOCUMENTS

| | | | |
|---|---|---|---|
| 3,452,966 | 7/1969 | Smolski | 261/124 |
| 3,933,654 | 1/1976 | Middlebeek | 210/23 R |
| 3,948,767 | 4/1976 | Chapman | 210/DIG. 5 |
| 3,969,446 | 7/1976 | Franklin | 261/124 |

Primary Examiner—Ernest G. Therkorn
Attorney, Agent, or Firm—O'Rourke & Harris

[57] ABSTRACT

Method and apparatus for separating dispersed multiphase, fluid systems by flowing a gaseous medium through a liquid phase in a plurality of substantially vertical conduit members positioned over a manifold member through which the gas is supplied; and removing the separated phases from the predominant liquid. The components to be separated may be dispersed in the liquid or the gas.

Flow of the gas through the conduit exposes the system to a large effective surface area as well as carrying the lighter components to the surface to form a separate, continuous phase, and inducing the heavier, usually solid, components to settle to the bottom of the apparatus. Optionally, particles may be included in the system to further increase the effective surface area.

35 Claims, 5 Drawing Figures

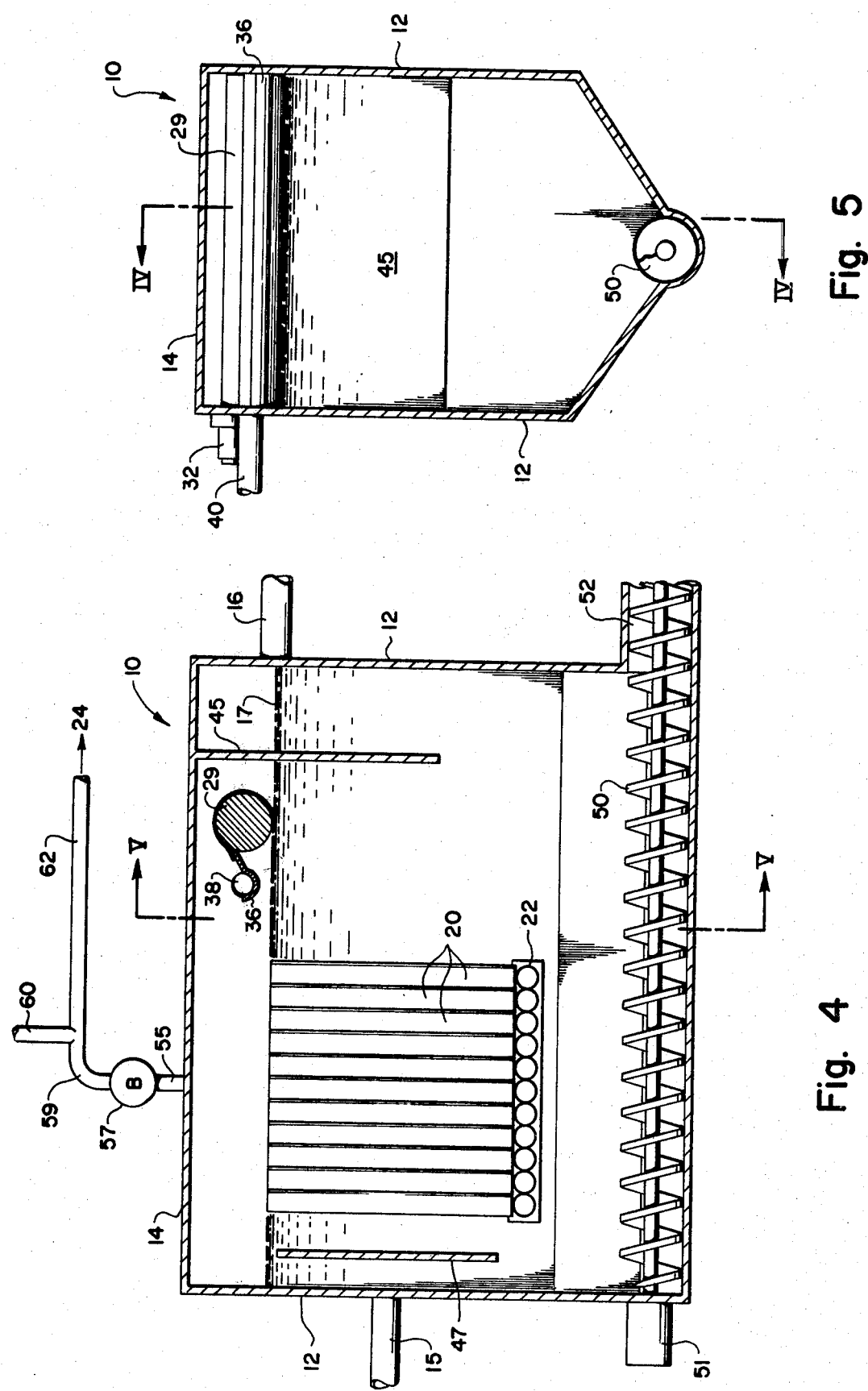

METHOD AND APPARATUS FOR TREATING HETEROGENEOUS FLUID SYSTEMS

BACKGROUND OF THE INVENTION

The present invention relates generally to treatment, and particularly separation, of multiphase systems in which a continuous phase is liquid and in which the various, dispersed phases differ in density from the liquid. Treatment is accomplished by utilizing a plurality of adjacent conduit members positioned to receive a gas flow—which may include a solid or liquid component to be separated—therethrough to lift and circulate the liquid. As the gas and liquid travel through the conduit, various separating mechanisms, including coalescence, movement of the light portions of the systems to the surface, and movement of the heavier portions of the systems to the bottom of the system, are accomplished. Optionally, particles of particular characteristics may be added to the system to increase the effective surface area.

DESCRIPTION OF THE RELATED ART

A classical separation problem is that of separation of oil and water systems in which oil droplets of varying particle sizes are dispersed through the liquid water phase. Stokes Law determines the rate at which a second phase—whether solid or liquid distinct phase particles—will separate from the basic liquid phase by movement to surface or bottom of the system. This rate is determined by parameters including particle size, density of the particle, density of the liquid continuous phase, and viscosity of the liquid continuous phase at the operating temperature.

A well known separatory device, the Corrugate Plate Interceptor (CPI), utilizes a fairly shallow tray in which a number of parallel plates are disposed. Flow is induced both to the surface and to the bottom of the system, while the plates provide surface area for coalescence. Small oil droplets tend to adhere to the plate surface, and merge into larger oil particles which, according to Stoke's Law, rise more rapidly to the surface. At the surface of the system, an oil skimmer may then be employed to remove the surface film of oil from the water. Similarly, solid, more dense particles tend to migrate to the bottom of the separator.

A particularly difficult problem in the separation of oil from water is encountered when emulsions of water and oil develop. Such emulsions may be either oil in water, or water in oil. In any event, the density of the emulsion approaches the density of the water phase. Accordingly, physical separation mechanisms predicated upon differences in density tend to be less effective. For this reason, a number of chemical emulsion breakers have been developed. However, physical mechanisms utilizing dissolved air flotation are effective in removing the emulsions, since small air bubbles which adhere to the emulsion particles effectively reduce the density of the emulsion and permit the emulsion to separate from the water at the top of the separator. While dissolved air flotation is effective, it is somewhat energy intense in that considerable energy is required to pump water into a pressurized air chamber so that the water may become saturated with dissolved air prior to pressure release in the separation area.

Thus, while a number of separators have been recognized as effective in providing for separation of multiphase liquid continuous phase systems, such systems are somewhat limited in performance in terms of separator size, throughput, and energy consumption.

It is, however, an advantage of the instant invention that an efficient separator is provided which utilizes most modest amounts of energy.

Another advantage of the instant invention is the efficiency resulting from the use of gas to lift and circulate the liquid system over a compact volume having substantial effective surface area.

Yet another advantage of the instant invention is a very compact separatory is provided which, however, is capable of treating substantial volumes of liquids or gases.

These and other advantages of the instant invention will become apparent from the following description.

BRIEF DESCRIPTION OF THE DRAWINGS

In the drawings:

FIG. 4 is a cross-sectional view along section line V—V of FIG. 5 of the separator shown in FIG. 1; and FIG. 5 is a cross-sectional view along section line IV—IV of FIG. 4 of the separator shown in FIG. 1.

DETAILED DESCRIPTION OF THE INVENTION

The following discussion will be primarily addressed to separation of oil droplets dispersed in water since this system is commonly encountered and difficult to deal with. However, it is to be understood that other systems can of course be treated in a similar manner, and that dispersed components in the gas can be likewise separated.

Figure 1:
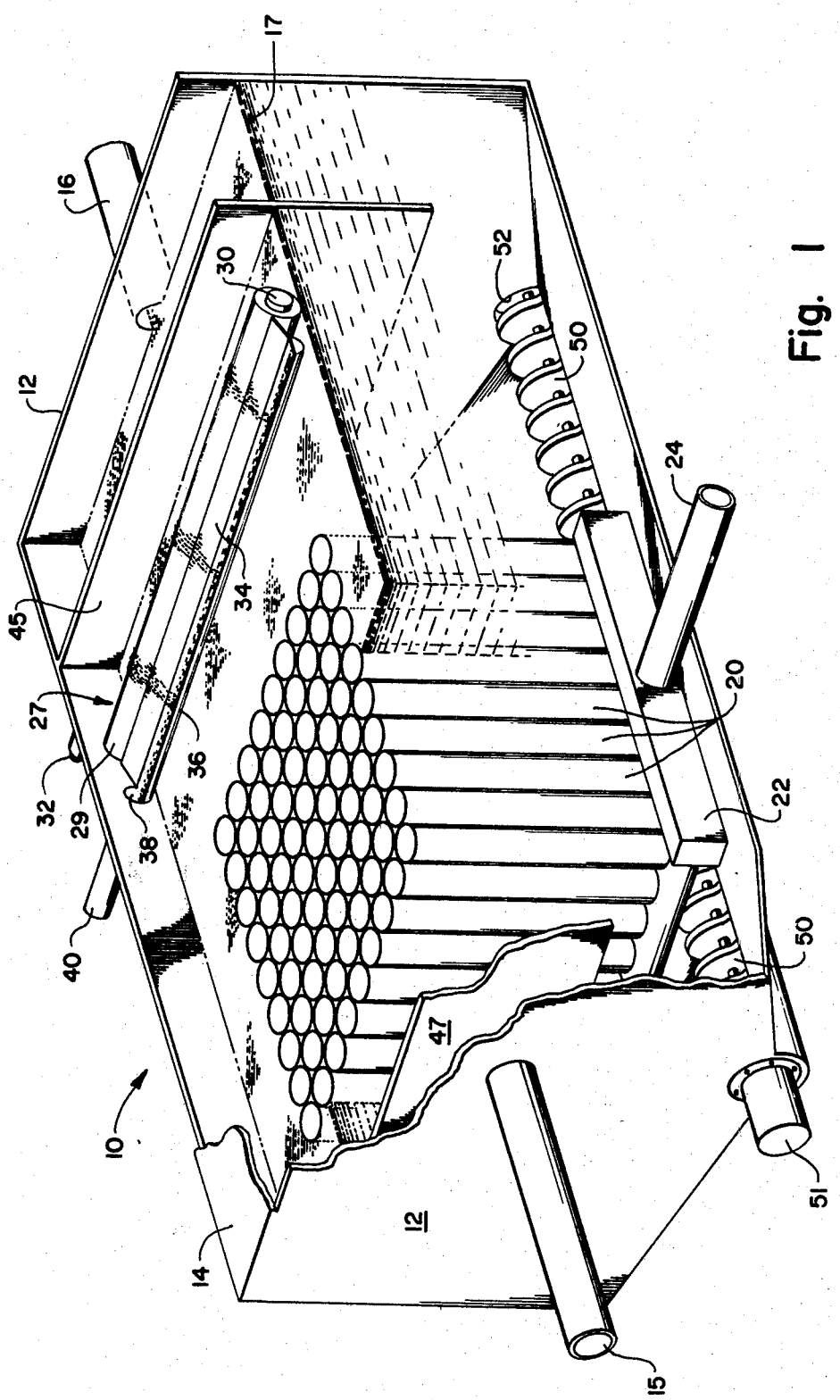
FIG. 1 is a perspective view, partially cut away, of a separator in accord with the instant invention.

Turning now to the drawings, wherein like components are designated by like numerals throughout the various figures, a separator in accord with the instant invention is shown in FIG. 1 and generally designated by reference numeral 10. As shown, separator 10 includes enclosure 12 having top cover 14 and inlet pipe 15 at one end thereof, and an outlet pipe 16 at the other end of enclosure 12. Liquid level 17 in enclosure 12 is, as illustrated, determined by the height of outlet pipe 16.

Figure 3:
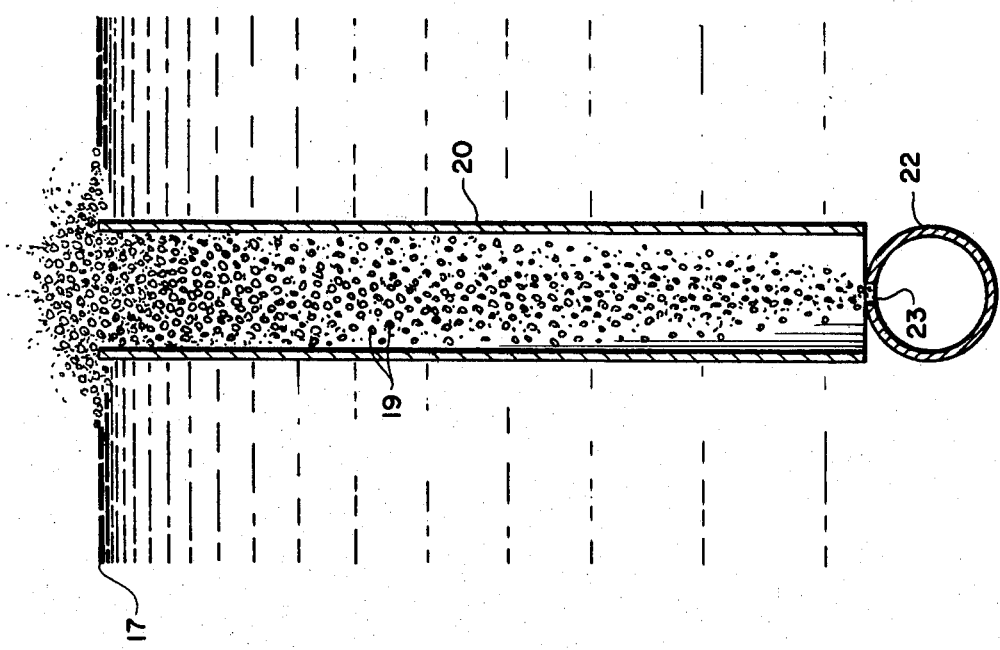
FIG. 3 is a section view of a conduit member and associated manifold of the separator shown in FIG. 1.
Figure 2:
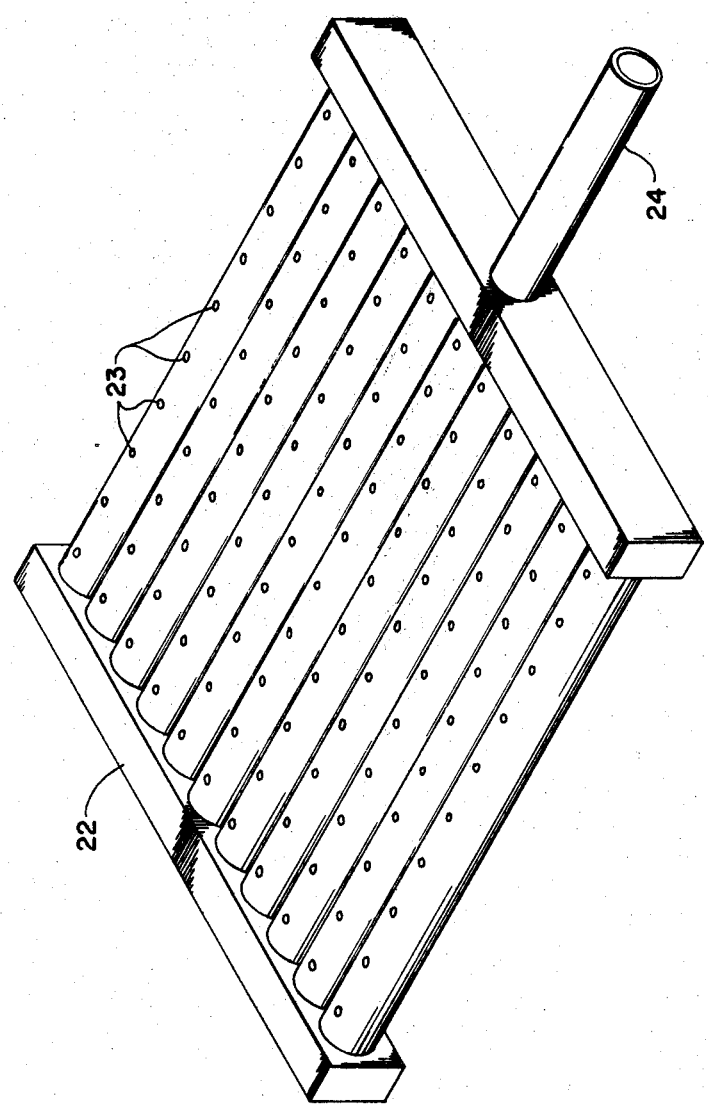
FIG. 2 is a perspective view of a typical manifold arrangement utilized in the separator shown in FIG. 1.

With particular reference to FIGS. 2 and 3, it is to be noted that bubbles 19 are induced in liquid contained within enclosure 12 by flowing a gas upward through a plurality of conduits 20 positioned over manifold 22. Vents 23, defined in manifold 22 immediately beneath each conduit 20 provide for a flow of bubbles 19 into each conduit 20. Gas inlet 24 communicates with manifold 22 and supplies a regulated flow of gas to manifold 22. As will be described below, in a preferred embodiment in which bubbles 19 are formed of a gas other than air, the system is a closed system and the gas is recycled with appropriate makeup. Liquid level 17 is regulated to about the upper end of conduits 20, though conduits 20 may be somewhat below liquid level 17.

Oil skimmer 27, shown in FIG. 1 and illustrated in more detail in FIGS. 4 and 5, is positioned adjacent surface of the liquid within enclosure 12. Oil skimmer 27, as illustrated, includes a cylinder 29 rotatably mounted in bearings 30 at either end thereof. A motor 32 is mounted to rotate cylinder 29 in, with reference to FIG. 4, a counterclockwise direction. Thus, an oil film on the surface of the liquid within enclosure 12 is skimmed from the liquid surface by rotating cylinder 29. Wiper 34 engages cylinder 29 and removes the oil film therefrom. Thereafter, the removed oil flows from wiper 34 to trough 36, and through opening 38 to oil removal outlet 40. While the illustrated oil skimmer 27, which is a conventional expedient known in the art is illustrated in conjunction with the preferred embodiment, it is to be understood that oil skimmers of various designs are known to the art and would be workable with separator 10. Other means for removing other materials from the surface of the liquid are known and would of course be employed for other than an oil-water system.

Oil which coalesces and forms a film at the surface of the liquid is prevented from flowing to outlet 16 by baffle 45 which extends above liquid level 17. Accordingly, water, or another continuous liquid phase, can flow under baffle 45. But the lighter phases, which would float on continuous phase, remain at the surface and thus prevented from flowing to outlet 16, but rather are contained adjacent oil skimmer 27 or other appropriate removal means for lighter materials.

Baffle 47, mounted adjacent inlet 15, provides a somewhat similar function. As will be apparent, mixed phase materials flowing into separator 10 engage baffle 47 and in part flow over the top of baffle 47 and in part flow over the top of baffle 47, and in part flow under baffle 47. Since lighter phases carried in the continuous phase will tend to move upward, and heavier phases will tend to move downward, baffle 47 provides for an initial separation. Particularly, large, light components will separate at the surface without the need for flow through conduits 20, and particularly heavy, large components will immediately move to the bottom of separator 10. Thus only the more difficult components are subjected to treatment in conduits 20.

With reference to the heavier components, which forms a sludge at the bottom of separator 10, means are provided for appropriate removal. While various means exist, and continuous buckets, Hapman Tubular Conveyor and other transport means would be equally appropriate, as illustrated, screw 50, mounted on bearing 51 and extending to sludge outlet 52 provided to remove sludge from the bottom of separator 10. A trap (not shown), such as an upward continuation of outlet 52 is provided to avoid liquid loss. As with oil skimmer 27, removal of sludge is a more or less conventional expedient which comes into play only after the more difficult and novel aspects of the separation, i.e., separation of the various phases into separate portions, is accomplished.

As shown in FIG. 4, gas outlet 55 communicates with interior enclosure 12 through top cover 14. Blower 57 is provided to induce circulation of gas with the outlet 59 of blower 57 communicating with gas makeup conduit 60. Additional gas from a reservoir (not shown) thus may be provided as needed. It is to be understood that losses of gas may be through leakage, and dissolved gas in the materials removed, for example. Pipe 62, carrying gas pressurized by blower 57 and with appropriate makeup from pipe 60, is connected to gas inlet 24, as shown, for instance, in FIGS. 1 and 2. Thus a closed cycle gas flow may be induced. In the event the gas carries the components to be separated, obviously a closed system would not be used.

THEORY OF OPERATION OF THE INVENTION

Separator 10, utilizes and optimizes several separatory mechanism. Flow of bubbles 19 upward through conduits 20, tends to carry the lighter constituents, and with reference to an oil and water dispersion, the oil particles, to the surface of this dispersion. Once at the surface, the oil particles tend not to migrate downward but to coalesce in an oil film. Also, coalescence of oil particles on the walls of conduits 20 occurs thereby forming larger particles which are more readily separated into a surface oil film. A number of passes through conduit 20 occurs, and accordingly the liquid flows downward over the outside walls of conduits 20 thereby inducing additional coalescense, and carries the heavier portions to the bottom of enclosure 12, thereby inducing separation of the sludge forming components.

While a number of gases may be employed, in general a readily available gas which is only slightly soluble in the liquid, and which obviously would be less dense than the liquid, is preferred. Typically, such gases include methane, ethane, propane, natural gas, carbon dioxide, carbon monoxide, nitrogen, oxygen, air. Flow rate of the liquid, which is a function of the gas flow rate, is preferably between 0.1 to 10.9 feet per second, but operable up to and including about 33 feet per second. Higher flow rates tend to induce excess turbulence with the undesirable mixing and redispersion of particles.

When at least one component to be separated is in the gas, initial separation is usually by wetting of the component at the interface of bubble 19 and the liquid. Once the component is in the liquid, the above mechanisms come to bear.

Effectiveness and efficiency of separator 10 can be enhanced with the addition of solid particles, such as powdered coal, plastic pellets, high density polypropylene, high density polyethylene, powered sulfur, spent catalyst, fly ash, and other such material. Such particles, which are preferably present in amounts of 0.5% to 1.0% by volume of the separator capacity, but operably up to about 5% by volume of the separator capacity, effectively increase the surface area of separator 10, and aid in breaking out the liquids and solids, and also assist in breaking emulsions. Such particles are of a density and sized to flow with the mixture being treated.

EXAMPLES

The advantages of the separator of the instant invention will be more readily appreciated through consideration of an analysis of a typical prior art separator and a typical separator in accord with the instant invention.

EXAMPLE 1

A 47 plate Corrugated Plate Interceptor Separator has a normal flow of 135 gallons per minute of oil-solid-water mixture. Each plate is 39¼" by 69" i.e. 18.8 sq. ft., and effectively 37.6 sq. ft. per plate in view of the two exposed sides of the plate. Accordingly the total effective surface area of such a separator is 1767.9 sq. ft., which is subject to a single pass of the mixture flowing therethrough.

EXAMPLE 2

A separator in accord with the instant invention typically contains 200 three inch schedule 40 plastic conduits, each 5 feet long, and having 8.6 sq. ft. (4.016 sq. ft. inside area and 4.581 sq. ft. outside area) per tube, or 1719.4 sq. ft. effective area for the entire separator, i.e. substantially the same as that of Example 1. As determined from the Ingersoll-Rand air lift formula, air injected at the base of a conduit 59 ¾" below the water surface will require 0.000498 cubic feet of air to lift one gallon of water ¼" above the water level. Thus, at the rate of 10 cubic feet of air per minute flowed through the 200 conduit separator, 20,090 gallons of water per minute will flow over the top of the conduits. Volume of each conduit is 1.92 gallons, and thus it follows that 52.318 changes of mixture per minute will occur in each conduit at such flow rate. This provides an effective surface area, on a dynamic basis of 89,955 square feet to which the mixture will be exposed. Not only will the mixture be exposed to a much greater effective surface are in the separator of the instant invention as compared to the Corrugated Plate Interceptor Separator of Example 1, but the mixture will flow vertically, thereby placing the lighter components adjacent the surface of the mixture, and the heavier components adjacent the bottom of the separator.

In summary, the instant invention provides an effective, compact and efficient separator for liquid based, multi-phased physical mixtures of components having different densities. By utilizing an air lift, the effective surface area and the desirable vertical flow of the mixture are greatly enhanced at extremely minimal energy requirements. Components dispersed in the liquid and/or the gas may be separated.

Although only limited embodiments of the present invention have been illustrated and/or described, it is apparent that various changes and modifications will be available to those skilled in the art as a result of the instant disclosure, and that such changes and modifications may be within the scope of the invention as defined by the following claims.

What is claimed is:

1. Apparatus for separating multiphase, fluid mixtures comprising:
   means to contain the multiphase, liquid mixtures;
   a plurality of substantially vertical, open ended conduit members positioned in mutually adjacent, close packed relationship in adjacent rows of several conduit members each with openings defined between the adjacent conduit members;
   gas distribution means having a plurality of gas outlets positioned with at least one gas outlet adjacent the opened bottom portion of each conduit member;
   means for maintaining a liquid level in the containment means substantially adjacent the open upper portion of the conduit members; and
   means for removing separated, initially dispersed components from the liquid;
   whereby gas flowing in bubble form upward through the conduits carries the liquid to the surface thereof and downward between the conduits while exposing the mixture to a substantial effective surface area to induce separation of dispersed, components for subsequent removal from the liquid.

2. Apparatus as set forth in claim 1 in which the conduit members are tubes of circular cross section and the gas distribution means comprise a manifold positioned immediately below the conduit members.

3. Apparatus as set forth in claim 1 in which the means for separating components from the liquid comprise an oil skimmer positioned at the surface of the liquid.

4. Apparatus as set forth in claim 3 in which the oil skimmer comprises a rotatably mounted cylinder adapted to partially engage the surface of the liquid, means for rotating the cylinder, wiper means positioned above the surface of the mixture and engaging the cylinder to remove constituents adhering to the cylinder therefrom, and collection means adapted to collect constituents removed from the cylinder.

5. Apparatus as set forth in claim 1 in which the multiphase mixture is a liquid mixture, the means for maintaining the liquid mixture level comprise an enclosure in which the mixture is contained during treatment, inlet means for flowing mixture into the enclosure, and outlet means for flowing treated mixture from the enclosure.

6. Apparatus as set forth in claim 5 in which a baffle is positioned within the enclosure, spaced from the inlet means, and extending both above and below the inlet means.

7. Apparatus as set forth in claim 5 in which a baffle extending both above and below the surface of the mixture within the enclosure is positioned to separate the outlet means from the means for removing constituents from the surface of the liquid.

8. Apparatus as set forth in claim 5 in which means are provided at the bottom of the enclosure for removing heavier, separated constituents from the enclosure.

9. Apparatus as set forth in claim 5 in which the enclosure is fully enclosed above the water level, and which further includes an outlet pipe to collect gases from above the liquid level, a blower having an outlet and communicating with the outlet pipe to pressurize such gases, the outlet from the blower being connected to the gas inlet whereby gases may be recycled.

10. Apparatus as set forth in claim 5 in which a plurality of particles are dispersed in the liquid to further increase the surface area from which the mixture is subjected.

11. Apparatus for separating a mixture of oil particles dispersed in water, the apparatus comprising:
    a tank adapted to receive and contain the mixture;
    a plurality of substantially vertical, open ended conduit members positioned within the tank and disposed in mutually adjacent, close packed relationship in adjacent rows of several conduit members each with openings defined between the adjacent conduit members;
    gas distribution means having a plurality of gas outlets positioned within the tank with at least one gas outlet adjacent the open bottom edge of each conduit member;
    means for maintaining a mixture level within the tank with the surface of the liquid being substantially at or adjacent the upper portion of the conduit members;
    inlet means for providing mixture to the interior of the tank; and
    means for removing separated oil from the surface of the mixture;
    whereby aerated oil and water mixture carried upward through the conduit members tends to coalesce the oil particles on the walls of the conduits and carry the lighter oil particle to the surface of the mixture to form a film which may be removed from the surface of the mixture, and the mixture flows both upwards within the conduits and downward between the conduits to provide a substantial effective surface area.

12. Apparatus as set forth in claim 11 in which the means for providing mixture to the interior of the tank is an inlet defined through the wall of the tank below the liquid level within the tank, and in which the apparatus further includes a vertical baffle positioned spaced from but adjacent to and substantially normal to the inlet with a portion of the baffle extending above the inlet and a portion of the baffle extending below the inlet.

13. Apparatus as set forth in claim 11 in which the means for maintaining the mixture level comprise an outlet defined through the wall of the tank and further including a baffle extending across the tank and both above and below the surface of the mixture level, the baffle being located between the means for removing the oil from the surface of the liquid and the outlet.

14. Apparatus as set forth in claim 11 in which the means for removing oil from the surface of the liquid comprise a cylinder rotatably mounted with only a portion of the cylinder contacting the mixture level, means to rotate the cylinder, wiper means engaging the cylinder and adapted to remove oil adhering to the cylinder, and trough means adjacent the wiper means and adapted to collect the oil from the wiper means.

15. Apparatus as set forth in claim 11 in which the tank is enclosed and includes an outlet defined therethrough above the mixture level, a blower connected to the outlet, the blower being in turn connected to the gas distribution means, whereby gas bubbled upward through the conduit may be collected, and pressurized for recycling through the gas distribution means.

16. Apparatus as set forth in claim 11 in which solid particles are dispersed below the liquid level but within the tank.

17. Apparatus as set forth in claim 16 in which the particles are selected from the group consisting of powdered coal, plastic pellets, high density polypropylene, high density polyethylene, powdered sulfur, spent catalyst, and fly ash, such particles being present in amounts less than five percent by volume of the liquid within the tank.

18. Apparatus as set forth in claim 17 in which the solid particles are present in amount between about 0.5% to 1.0% by volume of the liquid within the tank.

19. A method for separating constituents of differing densities dispersed in a fluid phase, the method comprising:
flowing gas bubbles into a liquid through a plurality of gas outlets positioned beneath the surface of a liquid to aerate the liquid;
moving the aerated liquid through a plurality of substantially vertical, open-ended conduit members positioned in mutually adjacent, close packed relationship in adjacent rows of several conduit members each with openings defined between the adjacent conduit members and immersed in the mixture;
separating at least a portion of constituents dispersed in at least one of the gas and liquid during flow through the conduit members;
forming a layer of separated, initially dispersed constituents; and
removing the layer of separated initial dispersed components from the liquid.

20. A method for separating constituents as set forth in claim 19 in which the liquid flows both upward through the conduit members and downward between the conduit members.

21. A method for separating constituents as set forth in claim 19 in which the dispersed constituent is carried in the gas.

22. A method for separating constituents as set forth in claim 19 in which the dispersed constituent is carried in mixture in liquid.

23. A method for separating constituents as set forth in claim 19 in which the dispersed constituent is denser than the liquid and is removed from beneath the liquid after separation.

24. A method for separating constituents as set forth in claim 19 in which the initially dispersed constituent is less dense than the liquid and is removed from the surface of the liquid after separation.

25. A method for separating constituents as set forth in claim 24 in which the initially dispersed constituent is a liquid.

26. A method for separating constituents as set forth in claim 24 in which the initially dispersed constituent is an oil.

27. A method for separating constituents as set forth in claim 26 in which the separated, initially dispersed components are removed by an oil skimmer.

28. A method for separating constituents as set forth in claim 19 in which the aerated liquid is flowed through the conduit member at the rate not greater than 33 feet per second.

29. A method for separating constituents as set forth in claim 28 in which the aerated liquid is flowed through the conduit members at a rate between about 0.1 feet per second to 10.9 feet per second.

30. A method for separating constituents as set forth in claim 19 in which the gas is selected from the group consisting of methane, ethane, propane, and natural gas, carbon monoxide, carbon dioxide, nitrogen, oxygen and air.

31. A method for separating constituents as set forth in claim 30 in which the gas is collected after bubbling through the liquid, compressed and recycled through the liquid.

32. A method for separating constituents as set forth in claim 19 in which particles are dispersed within the liquid to provide greater surface area of solids within the liquid.

33. A method for separating constituents as set forth in claim 32 in which particles are selected from the group consisting of powdered coal, plastic pellets, high density polypropylene, high density polyethelyene, powdered sulfur, spend catalyst, and fly ash.

34. A method for separating constituents as set forth in claim 33 in which the particles are present in an amount less than five percent by volume of the liquid present.

35. A method for separating constituents as set forth in claim 34 in which the particles are present in amounts between about 0.5% to 1.0% by volume of the liquid present.

* * * * *